United States Patent [19]

Kinlaw et al.

[11] Patent Number: 5,035,943
[45] Date of Patent: Jul. 30, 1991

[54] BREATHABLE FOAM-COATED NONWOVEN PILLOW TICKING

[75] Inventors: William S. Kinlaw; Alfred F. Baldwin, both of Greensboro, N.C.

[73] Assignee: Precision Fabrics Group, Greensboro, N.C.

[21] Appl. No.: 350,875

[22] Filed: May 12, 1989

[51] Int. Cl.$^5$ .................. B32B 27/00; B32B 5/18; B32B 5/22

[52] U.S. Cl. .................. 428/290; 428/296; 428/300; 428/306.6; 428/311.1; 428/311.5; 428/316.6; 428/920; 428/921

[58] Field of Search .............. 428/289, 290, 296, 300, 428/306.6, 311.1, 311.5, 316.6, 920, 921

[56] References Cited

U.S. PATENT DOCUMENTS

| | | | |
|---|---|---|---|
| 3,279,986 | 10/1966 | Hyman | 428/245 |
| 4,467,013 | 8/1984 | Baldwin | 428/289 |
| 4,499,139 | 2/1985 | Schortmann | 428/245 |
| 4,525,409 | 6/1985 | Elesh | 428/193 |
| 4,761,326 | 8/1988 | Barnes et al. | 428/315.5 |
| 4,910,078 | 3/1990 | Hill et al. | 428/289 |

Primary Examiner—William J. Van Balen
Attorney, Agent, or Firm—Finnegan, Henderson, Farabow, Garrett & Dunner

[57] ABSTRACT

A non-woven ticking fabric is foam-coated to provide good barrier properties to bacteria and liquids and post-cure treated to provide additional bacteriostatic or repellent properties.

12 Claims, 1 Drawing Sheet

BREATHABLE FOAM-COATED NONWOVEN PILLOW TICKING

BACKGROUND OF THE INVENTION

This invention pertains to ticking fabrics used to make hospital pillows and similar articles. The fabric is a nonwoven and is foam coated to produce a fluid-resistant, durable wipeable pillow covering or ticking having bacteriostatic properties.

Most ticking is a durable, closely woven fabric used for covering box springs, mattresses and pillows and may be woven in a plain, satin or twill weave, usually with strong warp yarns and soft filling yarns; see *Man-Made Fiber and Textile Dictionary* (1986) Celanese Corporation. Woven ticking may be used for apparel construction such as shirts, blouses and skirts.

The foam-coated nonwoven fabrics of this invention have foam coating specifically formulated to impart properties adapted to hospital or institutional use and reuse as a durable pillow cover or ticking.

There are a number of different quality levels of pillow ticking fabrics used to produce hospital pillows. In the hospital environment, these pillows may be exposed to body fluids and cleaning solutions, thus necessitating the need for a pillow fabric to be repellent to these fluids. With the increasing concern over disease transmission between patients, the single use, or disposable pillow, has become increasingly popular. These pillows are commonly produced using a cheap light-weight nonwoven fabric, having no bacteriostatic or repellency properties. Although the initial cost of the disposable pillow is less than the durable types, the cost per use is greater since the pillow is used for only one patient.

An object of this invention is to provide wipeable, light-weight, nonwoven pillow ticking that displays good barrier properties, bacteriostatic action, and is durable enough to be used several times before discarding, thereby producing advantageous cost per use performance.

Another object is to provide a pillow ticking that is breathable, repellent to water, oil and alcohol and similar liquids to which pillow ticking may be exposed in a hospital environment, and exhibiting soil release properties when wiped or cleaned.

DETAILED DESCRIPTION OF THE INVENTION

Figure 1:
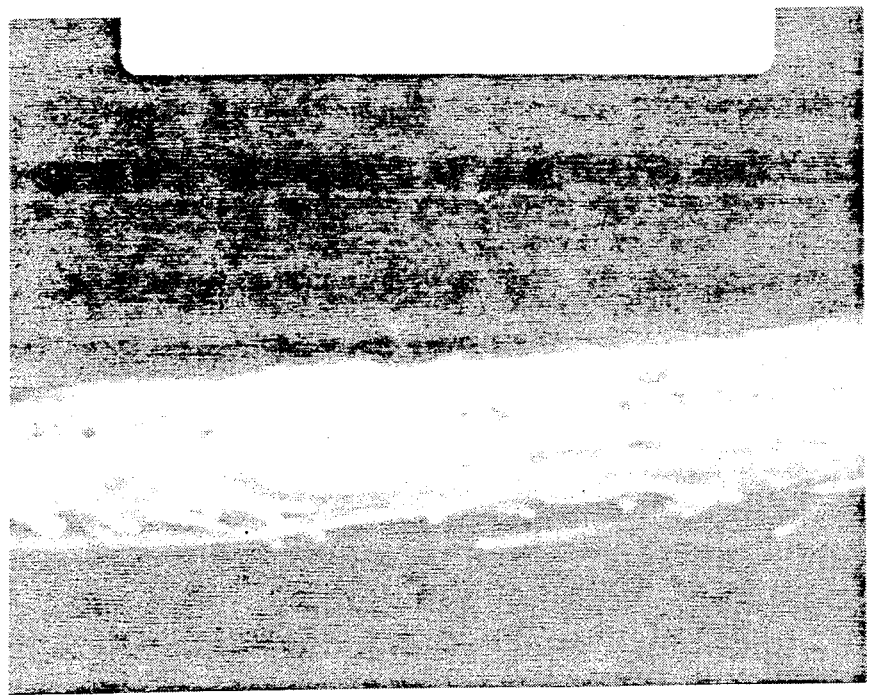
FIG. 1 is a photomicrograph at x50 showing the foam coated nonwoven fabric of this invention is cross section with the foam layer on the top surface and penetrating into the fibers of the nonwoven substrate.

The fabric of this invention is based on a nonwoven substrate, such as a spunbonded, spunbond-point-bonded, resin bonded, needle punched, spunlaced, thermal bonded as such or laminated of such composed of polyester, cellulosic, nylon or polypropylene fibers, to which is applied an open cell, stabilized foam. While the above-mentioned fabrics and constructions are preferred, other types of fabric could be used as a substrate for this invention.

Nonwoven suited for use as a substrate must satisfy a number of requirements, listed below generally in order of priority. The nonwoven must be relatively low in cost to permit the final product to be competitive. It must be light in weight, usually in the range of about 0.75 to about 2.0 ounces per yard. It must be relatively strong with grab tensile strength minimum of 10 pounds and trapezoidal tear strength minimum of 2 pounds. The structure should be relatively uniform, particularly free from thin areas that could disrupt foam continuity and thereby reduce barrier properties. Finally, the substrate must be soft with a good hand that lends itself to a pillow covering or ticking. Candidate nonwoven fabrics to be considered, but not limited to, include spunbond polypropylene commercially available as Celestra by James River, Accord by Kimberly Clark, Polybond by Wayne-Tex or Corovin by Corovin, Ltd. and Spunlace polyester nonwovens such as DuPont's Sontara, Veratec's Flexilon, and spunbonded nylon such as PBN-II from James River.

The process utilized to transform the above mentioned fabrics into the functional product of this invention is foam coating, using a stabilized foam. When applied to the fabric and processed, the foam forms a continuous network of open cell foam distributed among and adhered to the fibers, on the surface and within the fiber depth. The open cell foam structure provides an improved physical barrier to contamination by filling gaps and small holes in the interstices of the fabric as evidenced by lower air permeabilities as compared with the uncoated substrate. The foam, itself, can be modified to exhibit particular properties or characteristics by adding or deleting property modifying chemicals into the foam composition. Thus, the foam structure in combination with the foam's inherent attributes, provides the desired use characteristics to the fabric, particularly barrier properties.

The coating composition is based upon a resin or combination of resins plus filler(s) and indeed the filler(s) may represent more than half of the total weight of the two components. Other necessary ingredients include a foaming aid or surfactant to assist in forming a stable foam plus any other reactants or auxiliaries required to cross-link the resin and form a foam that, upon drying, remains stable and continues to exhibit the desired performance characteristics over the useful life of the article.

While not wishing to be limited exclusively to this group of polymers, a typical polymer selection may be an acrylic, styrene-butadiene rubber (SBR), vinyl acetate, polyvinyl alcohol, urethane, vinyl chloride, or vinylidene chloride or acrylonitrile polymer, preferably in the form of an aqueous dispersion.

The various fillers used to make the foam compound include but are not limited to clay, titanium dioxide, talc, mica, and pyropyllite. The type and amount of filler used is based on the need to control such properties as opacity, color, and coating tackiness.

In order to be able to make a stable foam, surfactants, humectants, and stabilizers, or combinations of such, are used in the foam composition. Ammonium stearate is probably the most popular type of foam stabilizer used, however, other foaming aids are often needed to improve foam consistency and runnability. Care must be taken, however, when using these products because using too much will result in loss of end use requirements such as barrier and repellency properties.

A thickening agent may need to be added to the foam formulation in order to achieve proper viscosity and improve the foam consistency. Appropriate thickening agents would include, but not be limited to, any natural or synthetic thickener such as a gum, carboxymethyl cellulose or polyacrylate.

Any number of a host of optional additives can either be incorporated into the foam compound, applied topically to the coated substrate, or both. These optional additives or auxiliaries act as property modifiers and are included in the formulation to impart the specific product characteristic(s) desired. The optional component could be any property modifying chemical which is compatible with either the foam compound or top finish mix.

Repellency to water, oil and alcohol is imparted to the fabric by using an effective amount of a fluoropolymer chemical. The optional fluorocarbon component is typically a dispersion of fluoropolymer in water. See generally Fluorine-Containing polymers, Encyclopedia of Polymer Science & Technology, pp. 179–203, Interscience, 1967, the disclosure of which hereby incorporated by reference. The fluoropolymer component may be selected from a host of commercially available products including DuPont's Zonyl NWG, Zonyl NWF, Zepel RS, Zepel RN and 3-M's FC-831, FC-834 and FC-461. One will select a repellent fluorocarbon component that is compatible with the system, i.e., the other bath components and processing conditions, is economical and provides the required water repellency.

A melamine resin, such as Aerotex 3030, Aerotex M-3 or Permafresh MEL, may be incorporated into the foam compound for an increased degree of polymer cross-linking, resulting in improved durability of the coating. A suitable catalyst, such as diammonium phosphate, magnesium chloride, ammonium chloride, or ammonium sulfate, is included to promote the cross-linking process. Catalyst concentration is in the range of 0.2 to 50.0% based on the amount of cross-linking resin used.

Fungicides and antimicrobial agents such as Dow Corning DC-5700 are used to give the product bacteriostatic properties.

After all of the adjustments and additions are made, the foam compound should meet certain specifications. Total solids of the coating compound should range from 40 to 70% by weight. The pH of the composition may be adjusted by the addition of a suitable base, such as ammonia, to maintain a pH in the range of 8–10. The coating composition, prior to foaming should have viscosity of from about 400 to 2,900 centipoise (mPa.s). The coating composition is usually maintained and applied at a temperature in the range of from 70° F. to 110° F.

The following is a typical formulation for the foam compound prior to foaming. Amounts expressed are on a parts per hundred by weight basis:

| Ingredients | Dry Parts |
| --- | --- |
| aqueous polymer dispersion (40–50% active) | 20–60 |
| melamine resin | .5–10.0 |
| filler: clay, talc, etc. | 15–45 |
| ammonium stearate (21%) | 1–7 |
| pigment | as needed |
| catalyst | .1–1.5 |
| thickeners | as needed |
| property modifiers | as needed |
| (flame retardant, water repellent, etc.) | |

The coating composition is mechanically foamed in a foam generator such as an Oakes foamer or a L.E.S.S. model 500 super foamer to achieve a ratio of from three to twenty parts air to one part coating composition, with a ration of 3:1–8:1 being preferred.

The compound is then applied by any convenient means, such as a knife coater (knife over roll, knife over gap, knife over table, knife over blanket, floating knife or air knife) or a gapped pad, or by dipping the substrate through the aerated compound. The coater is adjusted to apply the coating to the fabric in a fashion so as to both impregnate and surface coat the material. A knife coater at a speed of from 30 to 80 yards per minute. The combination of pressure and scraping action forces the coating into the fabric while leaving a thin surface coat. This serves to fill or partially fill the void space between the fibers and provide the degree of breathable barrier desired. Foam penetration into the nonwoven substrate should be sufficient to assure durability and resistance to abrasion. This allows the ticking to withstand repeated wipings.

Based upon the above considerations, a coating weight of between 0.2–2.0 oz/sq. yd. of solids should be applied with 0.3 to 0.8 being a preferred range.

The fabric is then dried at 150°–300° F. in a conventional hot air tenter frame or infrared, belt or drum dryer to remove at least 90% of the moisture from the structure. Curing temperatures range from 260° to 350° F., the upper limit dependent upon the type of fiber in the substrate. The coating may be crushed between a set of rollers which are typically rubber over steel, steel over steel, or steel over rubber. Following the optional step of crushing, the foam-coated fabric is nearly always post-cured for an additional thirty seconds to two minutes at 285° to 350° F., to attain maximum foam adhesion and abrasion resistance properties required for a wipeable product.

During or after the post cure, an additional finish may be applied to enhance the fabric properties, improve repellency, add softness and reduce blocking. The post cure may be omitted if all properties are achieved in the coating pass. The finished fabric is then trimmed and packaged.

The open cell, foam-coated nonwoven ticking of this invention has many or all of the following properties:

| | | |
| --- | --- | --- |
| basis weight (oz/yd$^2$) | | 1.0–3.0 |
| grab (lbs) | MD | 10 minimum |
| INDA 110.0-70 (R82) | XD | 10 minimum |
| spray rating | | 70–100 |
| INDA 80.1-70 (R82) | | |
| Frazier air permeability (ft$^3$/min/ft$^2$) | | 60–200 |
| INDA 70 1-70 (R82) | | |
| alcohol repellency | | 7–10 |
| INDA 80.9-74 (R82) | | |
| oil repellency - 3M Scotchguard | | 3–6 |
| INDA 80.8-70 (R82) | | |
| Suter hydrostatic head (cm.) | | 12 minimum |
| INDA 80.6-70 (R82) | | |
| Flammability: Federal Specification | MD | Class I |
| 16 CFR 1610 | XD | Class I |
| antimicrobial presence (pass/fail) | | pass |

EXAMPLE

A foam-coated nonwoven pillow ticking was prepared. First, a foamable composition containing the following ingredients was prepared:

|  | Dry Parts | Wet Parts |
| --- | --- | --- |
| foam compound (FB-7, High Point Chemical) | 92.9 | 88.1 |
| fluoropolymer (Zonyl N.W.A., DuPont) | 2.0 | 4.4 |
| ammonium stearate (AMS-34, B.I. Chemicals) | 2.5 | 5.4 |
| pigment (Inmont Pad, N Blue 3G, BASF) | .1 | .3 |
| resin (Resin M-3, American Cyanamid) | 2.2 | 1.3 |
| Catalyst (accelerator UTX, American Cyanamid) | .3 | .5 |

This formulation was dispersed in air using a mechanical foam generator then applied to Celestra II (James River), a 1.25 oz/yd$^2$ polypropylene substrate using knife-over-gap coater. The foam was applied to the top surface of the substrate and partially penetrated the dry nonwoven substrate giving a dry add-on 0.5–0.7 ounces per square yards. The fabric was then dried in a tenter frame at 230° F. to 250° F. for from 30 to 45 seconds, as required.

The foam-coated fabric was then post-treated to impart or enhance the bacteriostatic and repellent properties with a solution of:

|  | % wt. in bath |
| --- | --- |
| isopropyl alcohol (penetrant) | 1.25 |
| antimicrobial (DC 5700, Dow Corning) | 2.50 |
| fluorochemical (FC-824: 3M, Zepel 7040: Dupont) | 3.84 |

Figure 2:
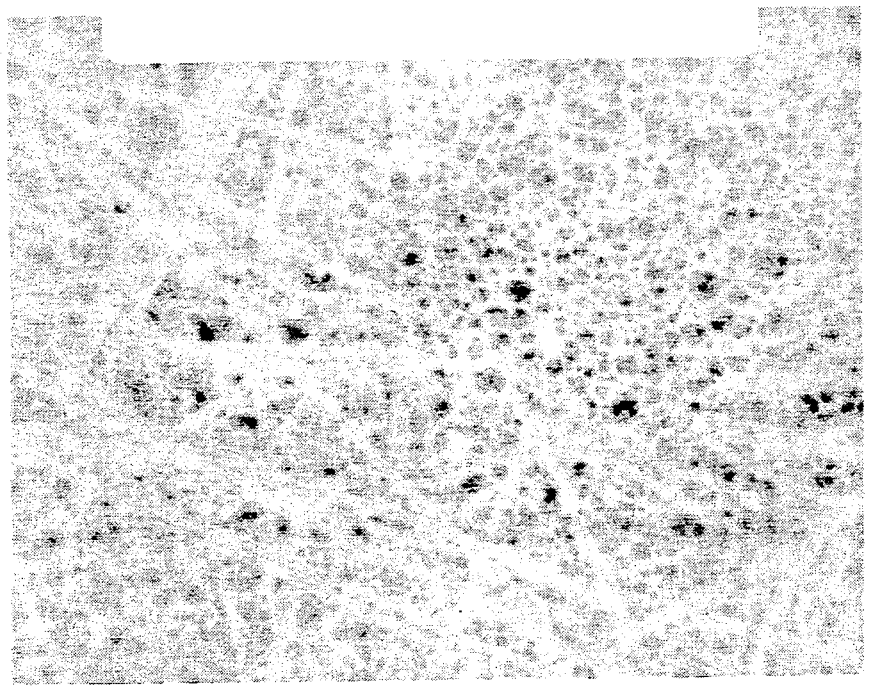
FIG. 2 is a top view of the same fabric illustrating the distribution and porosity of the open-cell foam overlying the fibrous nonwoven substrate. Both photographs illustrate the foam layer substantially within the nonwoven substrate.

This solution was applied in a pad bath, dried and cured at 260° F. to 280° F. for 45 seconds to 1.5 minutes. The photographs of FIGS. 1 and 2 are of the product so produced. The finished product was evaluated and had the following properties:

| basis weight (oz/yd$^2$) |  | 1.70–3.0 |
| --- | --- | --- |
| grab (lbs) | MD | 29–32 |
| INDA 110.0–70 (R82) | XD | 14–16 |
| spray rating INDA 80.1–70 (R92) |  | 90–95 |
| Frazier air permeability (ft$^3$/min/ft$^2$) INDA 70 1–70 (R82) |  | 110–120 |
| alcohol repellency INDA 80.9–74 (R82) |  | 10 |
| oil repellency INDA 80.8–70 (R82) |  | 5 |
| Suter hydrostatic head (cm.) INDA 80.6–70 (R82) |  | 15–18 |
| Flammability: Federal Specification 16 CFR 1610 | MD XD | Class I Class I |
| antimicrobial presence (pass/fail) |  | pass |

What is claimed is:

1. A wipeable, water repellent, lightweight, bacteriostatic foam-coated nonwoven ticking fabric composed of a nonwoven substrate coated with a continuous network of an open cell foam distributed on and covering one surface of and penetrating substantially into the center of the nonwoven substrate with the other surface of the nonwoven substantially devoid of foam, the resultant foam-coated fabric also treated with an antimicrobial agent to impart or enhance bacteriostatic properties, the fabric having a spray rating (INDA 80.1–70) from 70–100, a Frazier air permeability (INDA 70.1–70) between 60 to 200 ft$^3$/min/ft$^2$, a Suter hydrostatic head (INDA 80.6–70) of at least 12 centimeters and an oil-repellency (INDA 80.8–70) of at least 3.

2. The foam-coated ticking fabric of claim 1, having at least a Class I flammability rating according to Federal Specification (16 CFR 1610).

3. The foam coated ticking fabric of claim 1, having an alcohol repellency (INDA 80.9–74) of from 8 to 10.

4. The foam-coated ticking fabric of claim 1, in which the foam contains a polymeric binder selected from the group consisting of acrylic, styrene-butadiene rubber, vinyl acetate, urethane, vinyl chloride and vinylidene chloride polymers, together with at least one filler or opacifying agent and a fluorocarbon water repellent.

5. The foam-coated ticking fabric according to claim 4, in which the fabric is treated with an antimicrobial agent.

6. The foam-coated ticking fabric of claim 4, in which the polymeric binder is an acrylic resin and the foam contains titanium dioxide as an opacifier.

7. The foam-coated ticking fabric of claim 1, in which the foam coating extends from one surface to at most 50% of the thickness of the thickness of the nonwoven substrate.

8. The foam-coated ticking fabric of claim 1, in which the foam coating extends from one surface and completely saturates the substrate.

9. The foam-coated ticking fabric of claim 1, in which the nonwoven substrate is a hydroentangled nonwoven.

10. The foam-coated ticking fabric of claim 1, in which the nonwoven substrate is a pointbonded, spunbonded nonwoven.

11. The foam-coated ticking fabric of claim 1, in which the nonwoven substrate is a thermal bonded fabric.

12. The foam-coated ticking fabric of claim 1, in which the nonwoven substrate is a needle punched fabric.

* * * * *